July 22, 1947.  B. DICK  2,424,225
SEAL CONSTRUCTION
Filed Jan. 7, 1944
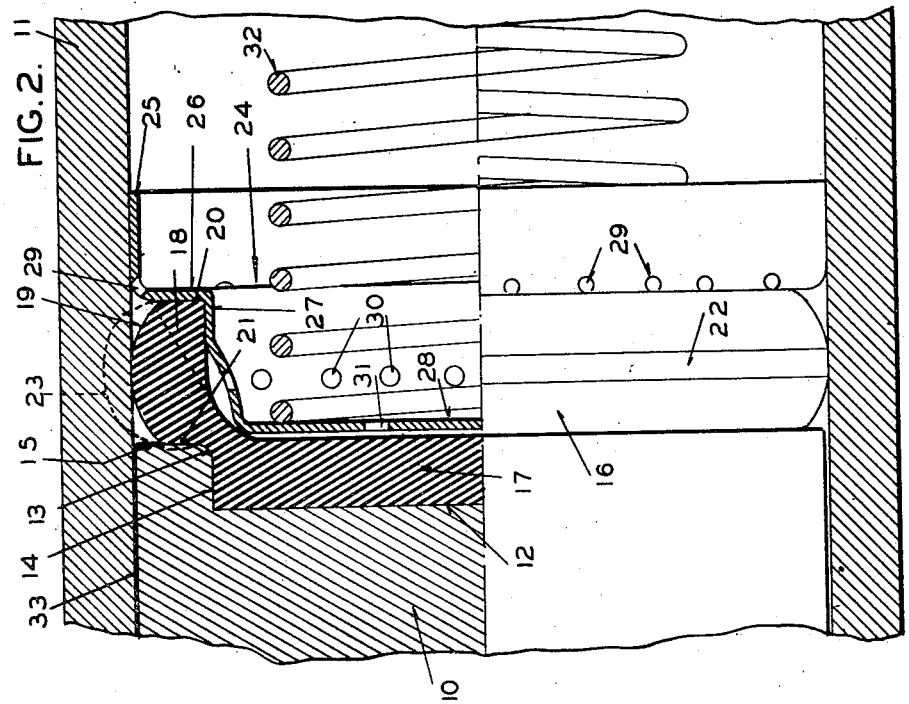
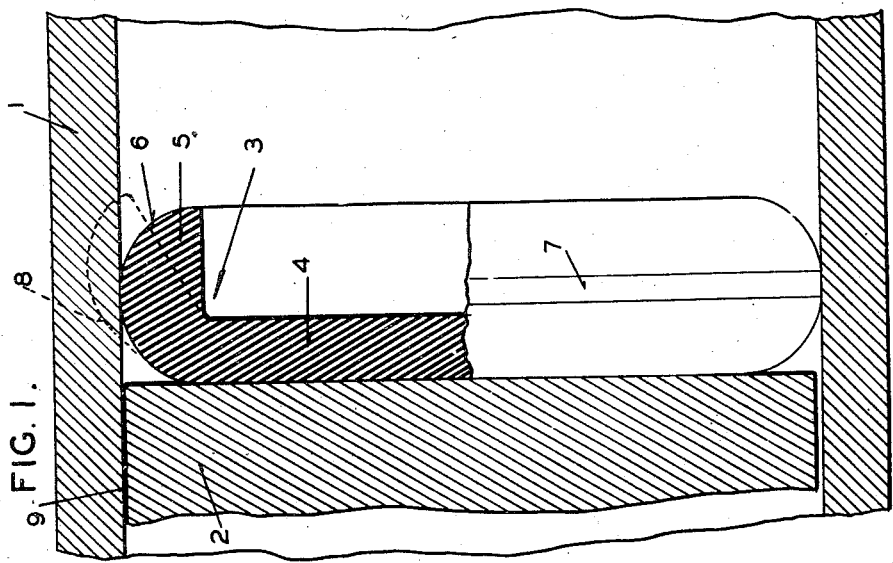
INVENTOR
BURNS DICK
BY
ATTORNEY Patented July 22, 1947

2,424,225

UNITED STATES PATENT OFFICE 2,424,225

SEAL CONSTRUCTION

Burns Dick, Ferguson, Mo., assignor to Wagner Electric Corporation, St. Louis, Mo., a corporation of Delaware Application January 7, 1944, Serial No. 517,357

8 Claims. (Cl. 309—33)

My invention relates to seals and more particularly to one for association with a piston and cylinder combination.

One of the objects of my invention is to produce an improved seal construction which will embody efficient sealing action and at the same time have less friction with the surface it engages as it moves relatively thereto.

Another object of my invention is to so construct a seal and associate it with a movable member, such as a piston, that it will not be damaged when fluid under pressure acts thereon and it is moved with the member relatively to a cooperating member, such as a cylinder.

Other objects of my invention will become apparent from the following description taken in connection with the accompanying drawings in which Figure 1 is a sectional view of a cylinder and piston combination having a sealing cup associated therewith and embodying my invention; and Figure 2 is a sectional view showing another sealing cup embodying my invention, said cup being constructed to cooperate in a different manner with a piston and to have a retainer associated therewith.

Referring to the drawings in detail and first to Figure 1, a cylinder 1 is shown having reciprocable therein a piston 2 and associated with this cylinder and piston is a packing cup 3 which embodies my invention, said packing cup being made of a yieldable material, such as rubber, synthetic rubber, a rubber compound, or the like. This packing cup has a base portion 4 and an annular lip portion 5. The lip portion, as shown, has a generally curved outer surface 6 as viewed in a radial section of the lip. This curved outer surface of the lip is in pressure engagement with the wall of the cylinder and the portion of the surface which is adapted to contact the cylindrical surface is formed to provide a narrow cylindrical surface indicated at 7. By providing the lip cup with this curved outer surface, only a small area thereof will be in contact with the cylinder wall and thus the friction between the cup and the wall will be considerably reduced over that of the ordinary packing cup having a substantially straight side wall engaging the cylinder wall over substantially the entire axial length of the lip. The curved surface arrangement of the lip also permits a more efficient lubrication of the surface engaging the cylinder wall. When the fluid to be sealed is a liquid, particularly a liquid having lubricating characteristics, such as hydraulic brake fluid or oil, the smaller contacting surface results in less surface to be lubricated and the outer curved surface permits liquid to more readily reach the contacting surfaces.

When the cup is molded, a two-part mold is employed, and the normal molded position of the lip is such that it will flare outwardly from the body 4 of the seal, as indicated by dashed lines. During the molding operation the two-part mold causes a flash, indicated at 8, to be formed on the periphery of the lip of the cup. This flash is removed and the periphery of the lip ground in order to produce the narrow surface 7. During the grinding operation the lip is held in the position it assumes when in the cylinder and sufficient grinding is done to make the diameter of the cup at the surface 7 equal to that of the diameter of the cylinder. Thus when the cup is placed in the cylinder the lip will assume the position shown and the narrow surface 7 will have proper contact with the cylinder wall because of the necessity of deforming the material of the cup in bringing the lip to the position it assumes when in the cylinder.

This particular cup construction has been found to produce very efficient sealing action. In service the cup will not be damaged as readily as prior cups, particularly because of the curved outer surface provided on the lip instead of a long straight surface having full contact over its length with the cylinder wall. The surface of the lip between the narrow surface 7 and the back wall of the body of the cup which engages the base of the piston provides a substantial space between the outer surface of the cup and the clearance 9 between the piston and cylinder wall. Consequently, the material of the cup will not be easily forced into this clearance 9 by high fluid pressures, thereby causing it to be "chewed" and damaged as the piston is reciprocated back and forth. Although the narrow surface 7 is shown as a cylindrical surface, it may, if desired, have a slight curve, as viewed in section, this curvature, however, not being as great as the surfaces on each side of the surface 7. The surfaces on each side of the narrow surfaces also may be conical, if desired, the principal requirement being that they recede away from the cylinder wall.

In the structure shown in Figure 2 piston 10 is reciprocable in cylinder 11 and the head of this piston is formed with a circular recess 12, a rounded corner 13 being provided where the wall 14 of this recess and the piston face surface 15 meet so that there will be no sharp edge to cut the packing cup. The packing cup 16 is provided with a cylindrical body 17 which fits into the recess 12 and with an integral lip portion 18 for cooperation with the wall of cylinder 11. As shown, this lip portion has a generally curved outer surface 19, as viewed in section, a substantially flat forward end surface 20, and a flat rear surface 21 adjacent the juncture of the lip with the body of the cup. This rear flat surface 21 engages the piston face surface 15. The outer surface of the lip is provided with a narrow cylindrical surface 22 for engagement with the cylinder wall, said surface resulting from a grinding operation after removal of the flash 23 resulting from the molding operation. When the cup is molded the lip is arranged to be flared outwardly from the body of the cup, as indicated by the dashed lines, to thus insure that the surface 22 will have pressure engagement with the cylinder wall when the cup is positioned therein.

Associated with the packing cup is a cup-shaped retainer 24 having a cylindrical guide portion 25 for cooperation with the wall of cylinder 11, a flat portion 26 at right angles to portion 25 for engagement with the flat end surface 20 of the lip of the cup, a cylindrical portion 27 for engaging the lip of the cup beneath its forward end, and a bottom portion 28 for association with the base portion 17 of the cup. The retainer is provided with various perforations 29, 30, and 31 to permit fluid to pass the retainer and act on the cup. The retainer is held in cooperation with the cup by the coil spring 32.

There will be no radial flow of the base portion 17 of the cup in this piston and sealing cup construction when high fluid pressures are present since the base portion is confined within recess 12 at the head of the piston. Consequently, there will be little possibility of the material of the cup being forced into clearance 33 and damaged. A large body of rubber forms the lip of the cup and because of this, the lip portion will resist such deformation as it will likely be forced into the clearance 33. The narrow surface 22 on the outer surface of the lip results in only a small surface of the lip being in contact with the cylinder wall and thus there will be less friction between the lip and the cylinder wall and less tendency of the lip to stick on the wall when the cup is subjected to high fluid pressures. Furthermore, since the large body of material forming the lip has a flat contacting surface with the piston surface 15, the piston can readily move the lip relatively to the cylinder wall, notwithstanding high fluid pressure. The retainer insures that the lip will be maintained in the proper position with the head of the piston and also will prevent collapse of the lip of the cup since the forward end of the lip of the cup is supported by the cylindrical portions 26 and 27 of the retainer. The retainer with the surface 15 of the head of the piston forms, in effect, an annular groove for the body of material forming the lip.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In apparatus of the class described, a cylinder, a piston reciprocable therein, a dished packing member of yieldable material associated with the piston and cylinder for sealing purposes, said packing member having a portion seated in a cavity in said piston, said packing member comprising an annular lip portion for engaging the cylinder wall, said lip portion containing a substantial body of the yieldable material and having a narrow peripheral surface intermediate its ends for engaging the cylinder wall and other outer surfaces on both sides of said narrow surface receding away from the cylinder wall toward the ends of the lip portion, the inner surface of said lip portion opposite the narrow surface being freely exposed to fluid under pressure in the cylinder, a dished retainer in said packing member cooperating with the end surface of the lip, the inner cylindrical surface and the end surface with the cavity in said dished packing cup, and spring means applying an axial pressure to the retainer in a direction toward the piston.

2. In apparatus of the class described, a cylinder, a piston reciprocable therein, a packing member of yieldable material associated with the piston and cylinder for sealing purposes, said packing member comprising an annular lip portion for engaging the cylinder wall, said lip portion containing a substantial body of the yieldable material and having a narrow peripheral surface intermediate its ends for engaging the cylinder wall and other outer surfaces on both sides of said narrow surface receding away from the cylinder wall toward the ends of the lip portion, the inner surface of said lip portion opposite the narrow surface being freely exposed to fluid under pressure in the cylinder, a retainer having a portion cooperating with the end surface of the lip and another portion extending beneath and engaging the inner surface of the lip portion adjacent its forward end, and spring means applying an axial pressure to the retainer in a direction toward the piston.

3. In apparatus of the class described, a cylinder, a piston reciprocable therein, a dished packing cup of yieldable material associated with the piston and cylinder, said packing member having a portion seated in a cavity in said piston, said packing cup comprising an annular lip for engagement with the cylinder wall, said lip being composed of a substantial body of the material and having an outer surface so formed that a narrow portion of said surface intermediate the ends of the lip engages the cylinder wall and the surface portions on the sides thereof recede away from the cylinder wall, said lip having flat end surfaces with the rear end surface engaging the end surface of the piston, a dished retainer arranged in said packing cup cooperating with the forward end surface of the lip and with the end and inner cylindrical surfaces thereof to support same, and spring means applying an axial pressure to the retainer in a direction toward the piston.

4. In apparatus of the class described, a cylinder, a piston reciprocable therein, a dished packing cup of yieldable material associated with the piston and cylinder, said packing cup having a base portion for engagement with the piston head and an annular lip portion for engagement with the cylinder wall, said lip portion having a narrow peripheral surface intermediate its ends for engaging the cylinder wall and other outer surfaces on both sides of the narrow surface receding away from the cylinder wall toward the ends of the lip portion, said forward end of the lip portion being provided with an annular flat surface, a dished retainer received within said packing cup engaging the flat end surface and with the end and inner cylindrical surfaces there- 5. In apparatus of the class described, a cylinder, a piston reciprocable therein, a packing cup of yieldable material associated with the piston and cylinder, said packing cup having a base portion for engagement with the piston head and an annular lip portion for engagement with the cylinder wall, said lip portion having a narrow peripheral surface intermediate its ends for engaging the cylinder wall and other outer surfaces on both sides of the narrow surface receding away from the cylinder wall toward the ends of the lip portion, said forward end of the lip portion being provided with an annular flat surface, a retainer having a portion engaging the flat end surface and another portion extending beneath and engaging the inner surface of the lip portion adjacent its forward end, and spring means for causing the flat surface of the retainer to have pressure engagement with said flat end surface.

6. In apparatus of the class described, a cylinder, a piston reciprocable therein, a dished packing cup of yieldable material associated with the piston and cylinder, said packing cup having a base portion for engagement with the piston head and an annular lip portion for engagement with the cylinder wall, said lip portion having a narrow peripheral surface intermediate its ends for engaging the cylinder wall and other outer surfaces on both sides of the narrow surface receding away from the cylinder wall toward the ends of the lip portion, said forward end of the lip portion being provided with an annular flat surface, a dished retainer having a cylindrical guide portion cooperating with the cylinder wall and a second portion engaging the forward end of the lip, another portion supporting the inner cylindrical surface and another portion engaging the end of said packing cup, and spring means for causing the flat surface of the retainer to have pressure engagement with said flat end surface.

7. In apparatus of the class described, a cylinder reciprocable therein and provided with a circular recess in its head surface, a dished packing cup of yieldable material associated with the piston and cylinder, said packing cup having a base portion positioned in the cylindrical recess and an integral annular lip portion extending forwardly therefrom for engagement with the cylinder wall, said lip portion having a narrow peripheral surface intermediate its ends for engaging the cylinder wall and other outer surfaces on both sides of the narrow surface receding away from the cylindrical wall toward the ends of the lip portion, said lip portion being provided with annular flat end surfaces, the rear one of which engages the end surface of the piston surrounding the circular recess, a dished retainer having a portion engaging the flat surface at the forward end of the lip, another portion supporting the inner cylindrical surface and another portion engaging the end of said packing cup, and spring means for causing the flat surface of the retainer to have pressure engagement with said flat end surface.

8. In apparatus of the class described, a cylinder reciprocable therein and provided with a circular recess in its head surface, a packing cup of yieldable material associated with the piston and cylinder, said packing cup having a base portion positioned in the cylindrical recess and an integral annular lip portion extending forwardly therefrom for engagement with the cylinder wall, said lip portion having a narrow peripheral surface intermediate its ends for engaging the cylinder wall and other outer surfaces on both sides of the narrow surface receding away from the cylindrical wall toward the ends of the lip portion, said lip portion being provided with annular flat end surfaces, the rear one of which engages the end surface of the piston surrounding the circular recess, a retainer having a portion engaging the flat surface at the forward end of the lip and another portion extending beneath and engaging the inner surface of the lip portion adjacent its forward end, and spring means for causing the flat surface of the retainer to have pressure engagement with said flat end surface.

BURNS DICK.

REFERENCES CITED

The following references are of record in the file of this patent:

UNITED STATES PATENTS

| Number | Name | Date |
| --- | --- | --- |
| 1,673,440 | Brinton | June 12, 1928 |
| 2,283,460 | Pumphrey | May 19, 1942 |
| 1,889,857 | Gardner | Dec. 6, 1932 |
| 458,130 | Price | Aug. 18, 1891 |
| 1,395,302 | Shalkop | Nov. 1, 1921 |
| 2,315,944 | Dick | Apr. 6, 1943 |

FOREIGN PATENTS

| Number | Country | Date |
| --- | --- | --- |
| 518,600 | Great Britain | Mar. 1, 1940 |